(12) United States Patent
Kondo et al.

(10) Patent No.: US 9,031,787 B2
(45) Date of Patent: May 12, 2015

(54) LANE GUIDANCE DISPLAY SYSTEM, LANE GUIDANCE DISPLAY METHOD, AND LANE GUIDANCE DISPLAY PROGRAM

(71) Applicant: Aisin AW Co., Ltd., Anjo-shi, Aichi-ken (JP)

(72) Inventors: Yoshito Kondo, Okazaki (JP); Ken Ishikawa, Okazaki (JP); Yuusuke Morita, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 14/343,451

(22) PCT Filed: Oct. 4, 2012

(86) PCT No.: PCT/JP2012/006390
§ 371 (c)(1),
(2) Date: Mar. 7, 2014

(87) PCT Pub. No.: WO2013/065234
PCT Pub. Date: May 10, 2013

(65) Prior Publication Data
US 2014/0297181 A1 Oct. 2, 2014

(30) Foreign Application Priority Data
Nov. 2, 2011 (JP) .................................. 2011-241509

(51) Int. Cl.
*G08G 1/123* (2006.01)
*G01C 21/36* (2006.01)
*G08G 1/0962* (2006.01)

(52) U.S. Cl.
CPC ........ *G01C 21/3658* (2013.01); *G08G 1/09626* (2013.01)

(58) Field of Classification Search
CPC ............... G01C 21/36; G01C 21/3647; G01C 21/3658; B08G 1/0962; B61L 29/00; B61L 5/06; B61L 5/12

USPC ................. 701/400, 431, 532; 348/118, 148; 340/928, 932.2; 246/473.1
See application file for complete search history.

(56) References Cited

U.S. PATENT DOCUMENTS 8,630,801 B2 * 1/2014 Katzer .......................... 701/431
2008/0208450 A1 8/2008 Katzer
(Continued)

FOREIGN PATENT DOCUMENTS

| JP | 10-281795 | * 10/1998 |
|---|---|---|
| JP | A-10-281795 | 10/1998 |
| WO | WO 2009/149959 A1 | 12/2009 |

OTHER PUBLICATIONS

International Search Report issued in International Application No. PCT/JP2012/006390 mailed Dec. 21, 2012.
(Continued)

*Primary Examiner* — McDieunel Marc
(74) *Attorney, Agent, or Firm* — Oliff PLC

(57) ABSTRACT

A determination unit that determines whether a vehicle is in a lane change state where the vehicle is going to make a lane change from a travelling lane to a recommended lane; and a display control unit that causes a display unit to display the front image on which a guide line is superimposed, wherein the guide line has a front end point and a rear end point, are provided. In the lane change state, the display control unit sets a position of the rear end point in the front image such that the rear end point indicates a central position in a width direction of the vehicle, and, not in the lane change state, the display control unit sets a position of the rear end point in the front image such that the rear end point indicates a central position in a width direction in the travelling lane.

10 Claims, 8 Drawing Sheets

(56) References Cited

U.S. PATENT DOCUMENTS

| | | |
|---|---|---|
| 2010/0131197 A1 | 5/2010 | Zhang et al. |
| 2014/0210646 A1* | 7/2014 | Subramanya ............. 340/928 |
| 2014/0218509 A1* | 8/2014 | Kondo et al. ............. 348/118 |
| 2014/0229106 A1* | 8/2014 | Ishikawa et al. ............. 701/533 |
| 2014/0236473 A1* | 8/2014 | Kondo et al. ............. 701/400 |

OTHER PUBLICATIONS

Written Opinion of the International Searching Authority issued in International Application No. PCT/JP2012/006390 mailed Dec. 21, 2012.

* cited by examiner

Fig. 3
FIG. 3A
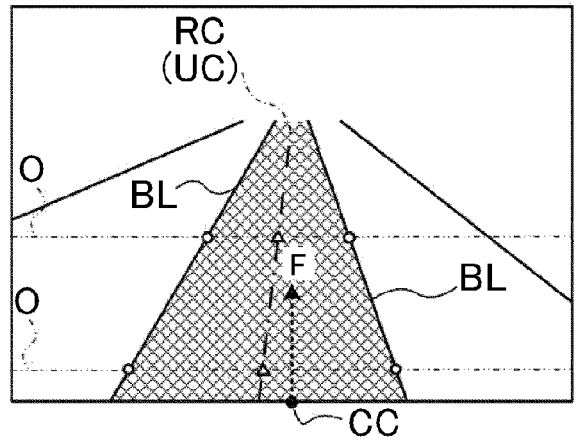
FIG. 3B
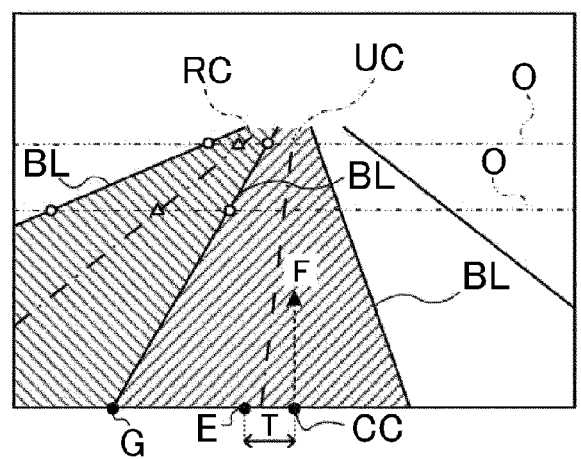
FIG. 3C
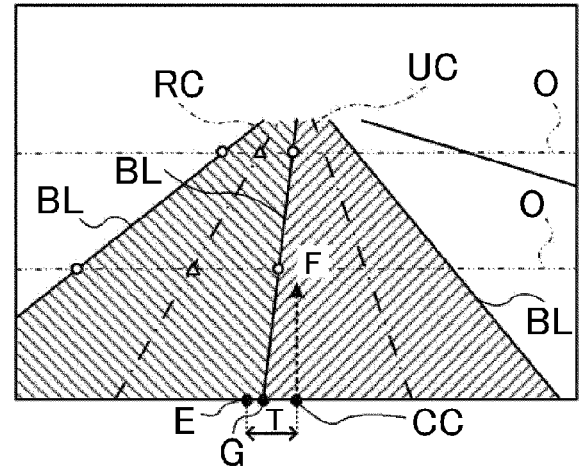

Fig. 4
FIG. 4A
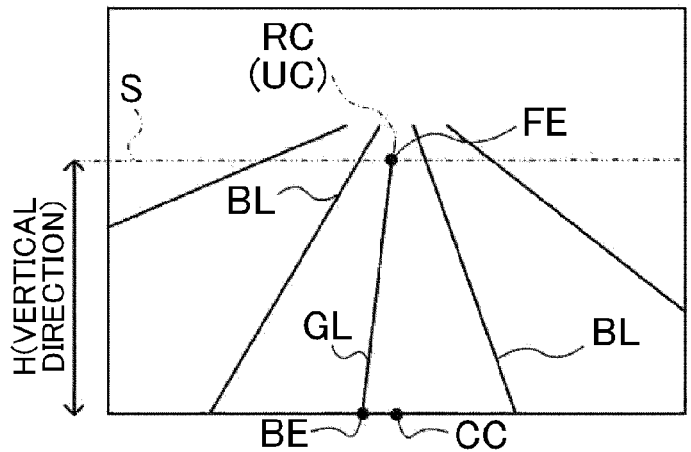
FIG. 4B
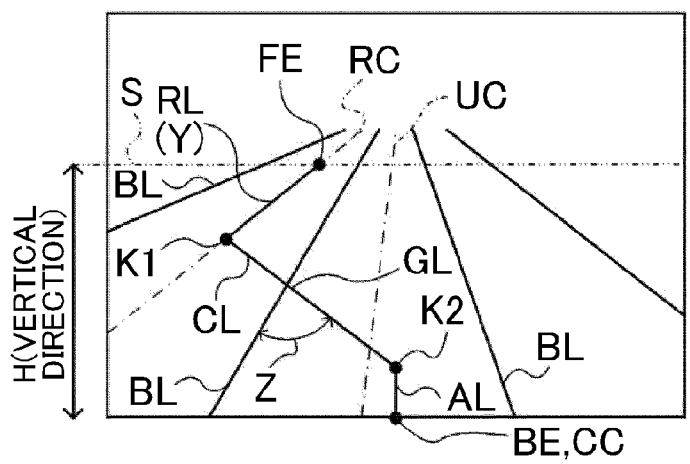
FIG. 4C
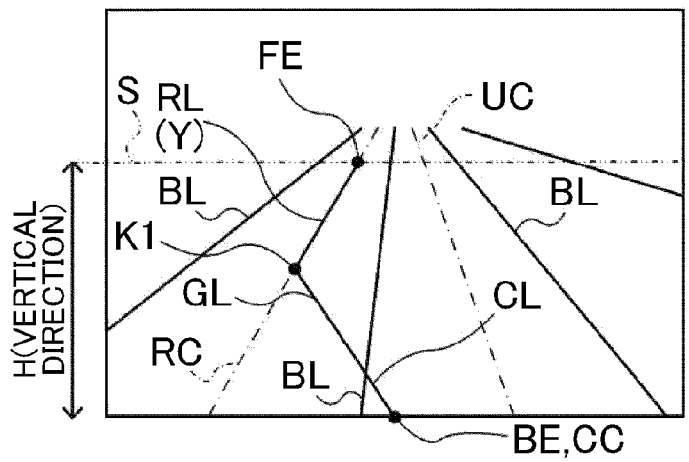

Fig. 5
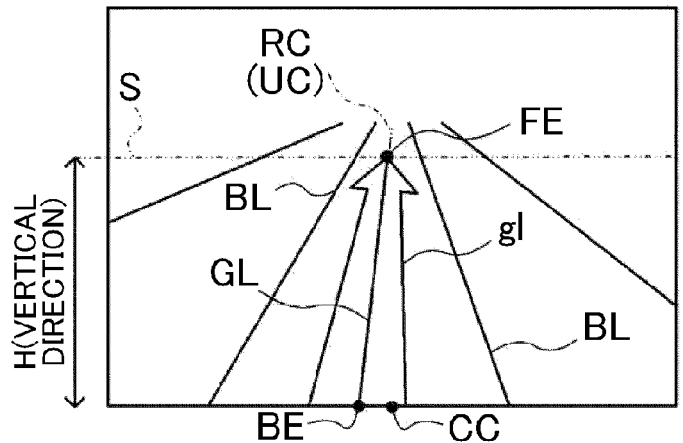
FIG. 5A
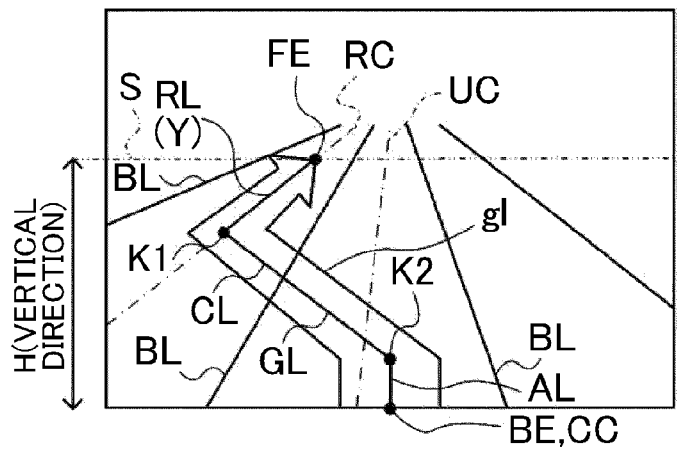
FIG. 5B
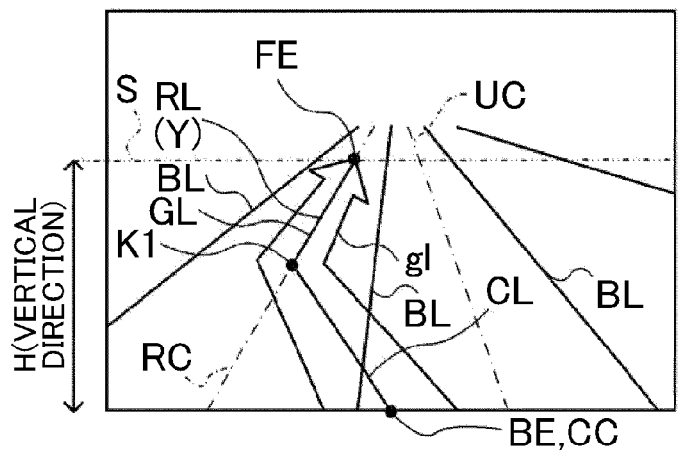
FIG. 5C

Fig. 7
FIG. 7A
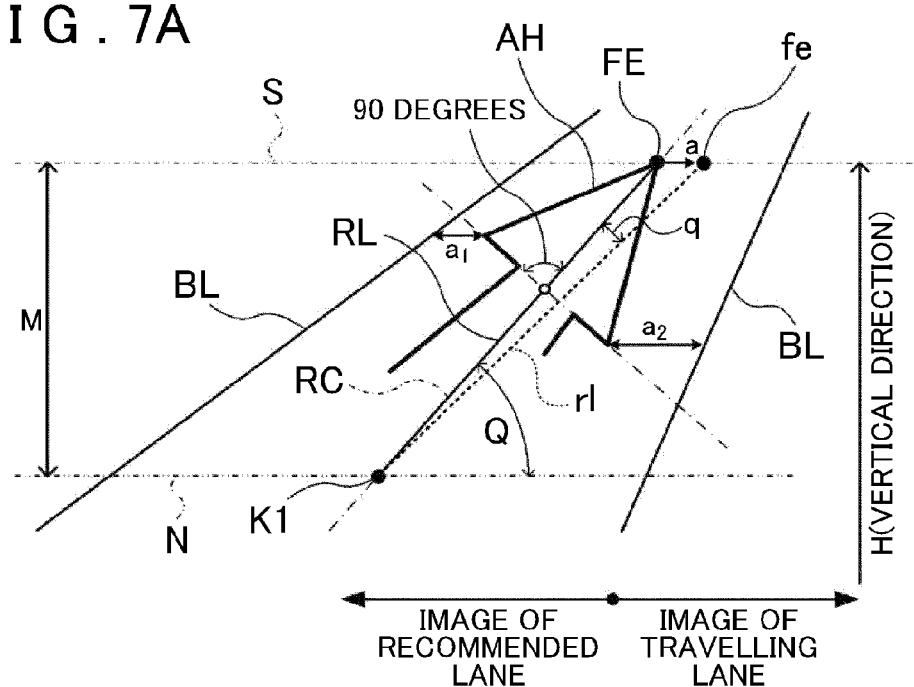
IMAGE OF RECOMMENDED LANE | IMAGE OF TRAVELLING LANE
FIG. 7B
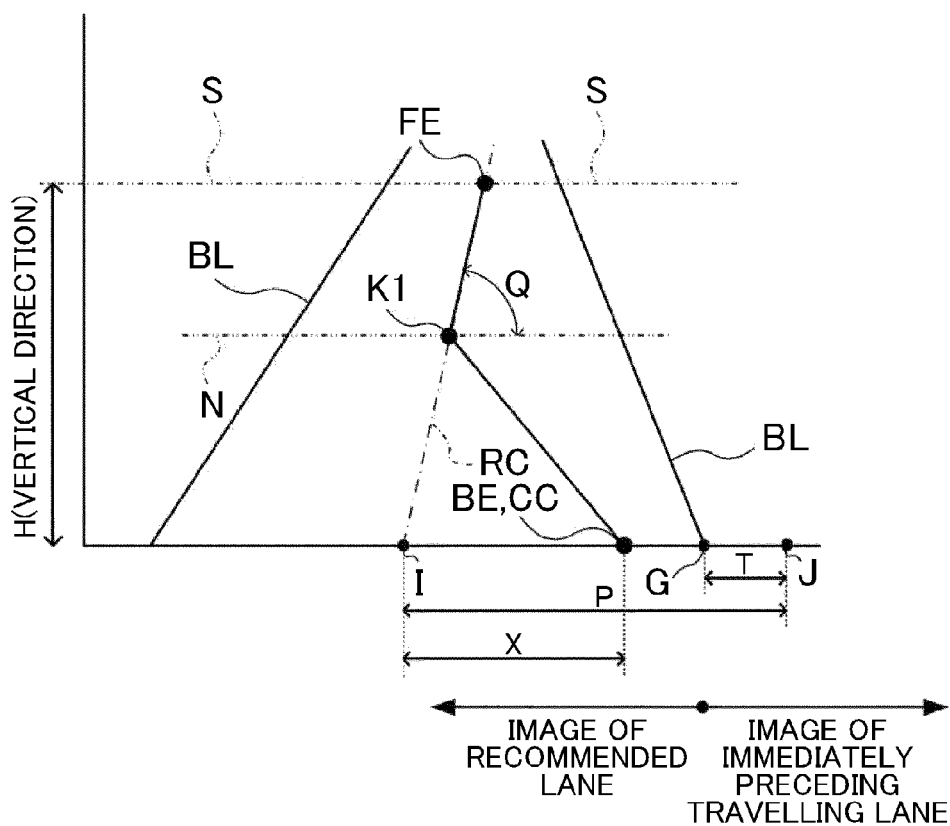
IMAGE OF RECOMMENDED LANE | IMAGE OF IMMEDIATELY PRECEDING TRAVELLING LANE

LANE GUIDANCE DISPLAY SYSTEM, LANE GUIDANCE DISPLAY METHOD, AND LANE GUIDANCE DISPLAY PROGRAM

TECHNICAL FIELD

The present invention relates to a lane guidance display system, lane guidance display method and lane guidance display program that for displaying guidance on a recommended lane in which a vehicle should travel.

BACKGROUND ART

There is known an existing technique for displaying a front image obtained by capturing an area ahead of a vehicle such that an arrow, indicating a position of a recommended lane in which the vehicle should travel, is superimposed on the front image (see PTL 1 (Japanese Patent Application Publication No. 10-281795 (JP 10-281795 A))). In PTL 1, a lower end point of the arrow is set so as to indicate a position of the vehicle.

CITATION LIST

Patent Literature

PTL 1: Japanese Patent Application Publication No. 10-281795 (JP 10-281795 A)

SUMMARY OF INVENTION

Technical Problem

When a driver does not intend to change lanes, a variation in the position of the vehicle in the width direction of the lanes may be regarded as just sway of the vehicle, which is not intended by the driver. In PTL 1, when the driver does not intend to change lanes as well, the position of the lower end point of the arrow on the front image changes with a variation in the position of the vehicle in the width direction of the lanes. Therefore, there is inconvenience that the position of the lower end point of the arrow on the front image sways with respect to images of lane separation lines with sway of the vehicle, which is not intended by the driver. In addition, the position of the lower end point of the arrow on the front image changes with sway of the vehicle, which is not intended by the driver, so there is inconvenience that the driver is unnecessarily alerted.

The present invention is contemplated in view of the above inconveniences, and it is an object of the present invention to provide a technique for preventing a decrease in the visibility of a guide line due to sway of the guide line with respect to images of lane separation lines.

Solution to Problem

In order to achieve the above described object, in the present invention, a front image acquisition unit acquires a front image obtained by capturing an area ahead of a vehicle. A lane identification unit identifies a travelling lane in which the vehicle is currently travelling in the front image. In addition, the lane identification unit identifies a recommended lane in which the vehicle should travel in the front image. The determination unit determines whether the vehicle is in a lane change state where the vehicle is going to make a lane change from the travelling lane to the recommended lane. The display control unit generates a guide line that has a front end point that indicates a position inside the recommended lane and has a rear end point that indicates a position rearward of the front end point. Then, the display control unit causes a display unit to display the front image on which the generated guide line is superimposed. In addition, when the vehicle is in the lane change state, the display control unit sets a position of the rear end point in the front image such that the rear end point indicates a central position in a width direction of the vehicle. On the other hand, when the vehicle is not in the lane change state, the display control unit sets a position of the rear end point in the front image such that the rear end point indicates a central position in a width direction in the travelling lane.

In the above configuration, in the lane change state, the display control unit sets a position of the rear end point in the front image such that the rear end point indicates a central position in a width direction of the vehicle. By so doing, it is possible to set the rear end point of the guide line such that the rear end point constantly indicates the widthwise central position of the vehicle in the front image. Thus, it is possible to vary the position of the rear end point of the guide line such that the rear end point follows the widthwise central position of the vehicle, which varies with a lane change. That is, it is possible to move the rear end point of the guide line from the image of the travelling lane to the image of the recommended lane in the front image by following the widthwise central position of the vehicle that moves from the travelling lane side to the recommended lane side with a lane change. Thus, it is possible to superimpose the guide line appropriate to the progress of a lane change on the front image. Note that a state that the position of the rear end point varies following the widthwise central position of the vehicle does not always mean a state that the absolute position of the rear end point in the front image varies, but an image of the travelling lane and an image of the recommended lane in the front image just need to relatively vary in position with respect to the rear end point.

On the other hand, not in the lane change state but in the state where the vehicle continuously travels on the travelling lane, when the widthwise central position of the vehicle varies, it may be assumed that the position in the width direction of the vehicle is just varied due to sway of the vehicle, which is not intended by the driver. In this way, when the position in the width direction, indicated by the rear end point of the guide line, varies following sway of the vehicle, which is not intended by the driver, the visibility of the guide line decreases. Then, when the vehicle is not in the lane change state, the display control unit sets a position of the rear end point in the front image such that the rear end point indicates a central position in a width direction in the travelling lane. By so doing, it is possible for the position indicated by the rear end point not to follow the position of the vehicle in the width direction of the travelling lane to approach or move away from the images of the separation lines of the travelling lane, so it is possible to prevent a decrease in the visibility of the guide line. Furthermore, it is possible to prevent the driver from being unnecessarily alerted.

The front image acquisition unit may acquire a front image obtained by capturing an area ahead of the vehicle, and, for example, may acquire a front image from a camera that includes an area ahead of the vehicle in its field of vision. Note that an area ahead of the vehicle means an area ahead in a travelling direction of the vehicle. Particularly, when a front side in a lane is referred to, the front side means a front side in the travelling direction (lane direction) of the vehicle in that lane. In addition, the position of the front end point and the position of the rear end point respectively mean positions on the front image, and the position indicated by the front end point and the position indicated by the rear end point respectively mean positions in an actual space.

The lane identification unit just needs to identify a lane in which the vehicle should travel as the recommended lane, and the recommended lane may be a lane along which the vehicle can be reached a destination in a scheduled travel route found in advance. Furthermore, when there is a lane that the vehicle should enter at an intersection ahead of the vehicle in a scheduled travel route, the lane identification unit may identify the lane as a recommended lane when the vehicle has approached the intersection within a predetermined distance. In addition, the lane identification unit may identify a lane in which the vehicle is able to more safely or more smoothly travel than the other lanes on a travelling road on which the vehicle is travelling as a recommended lane. The lane identification unit just needs to identify a lane in which the vehicle is currently travelling as the travelling lane, and just needs to identify a lane in which a current position of the vehicle is present as the travelling lane. In addition, the lane identification unit may identify the travelling lane by recognizing an image of the travelling lane in the front image. Note that the recommended lane and the travelling lane may be different lanes from each other or may be the same lane.

The determination unit just needs to determine whether the vehicle is in a lane change state where the vehicle is going to make a lane change from the travelling lane to the recommended lane, and is able to determine whether the vehicle is in the lane change state on the basis of various determination elements related to the possibility of lane change. For example, the determination unit may determine whether the vehicle is in the lane change state on the basis of determination elements, such as a state of the driver, an operation state of the vehicle, a driving operation state of the vehicle and a state of a surrounding environment.

The display control unit just needs to generate a guide line that has a front end point as a front-side end point and that has a rear end point as a rear-side end point, and the guide line can be various line shapes and connects the front end point to the rear end point. In addition, the guide line is not limited to a line that is continuous between the front end point and the rear end point, and may be a broken line or a dotted line. Furthermore, the guide line is not limited to a narrow line, but it may be a figure, such as an arrow, that connects the front end point to the rear end point in the front image. Here, when the recommended lane and the travelling lane are different lanes, the guide line that connects the rear end point indicating the position at which the vehicle is currently travelling to the front end point indicating the position inside the recommended lane intersects with an image of a separation line present between the travelling lane and the recommended lane in the front image. Thus, with the use of the guide line that intersects with an image of a separation line present between the travelling lane and the recommended lane in the front image, the driver is able to recognize guidance that a lane change should be made from the travelling lane to the recommended lane. On the other hand, when the recommended lane and the travelling lane are the same lane, the rear end point and the front end point both are located inside the travelling lane, so the driver is able to recognize guidance that the vehicle should travel in the travelling lane as-is.

When the travelling lane and the recommended lane are different from each other, the determination unit may determine that the vehicle is in the lane change state. When the travelling lane and the recommended lane are different from each other, the vehicle is highly likely to make a lane change from the travelling lane to the recommended lane, so the determination unit can determine that the vehicle is in the lane change state. Here, at the timing of a shift from the state where the travelling lane and the recommended lane are the same to the state where the travelling lane and the recommended lane are different, the display control unit varies the guide line from the state where the front end point and the rear end point indicate positions in the same lane to the state where the front end point and the rear end point indicate positions in different lanes. The determination unit determines that the vehicle is in the lane change state when the travelling lane and the recommended lane are different. By so doing, in synchronization with the timing at which the change occurs from the state where the front end point and the rear end point indicate positions in the same lane to the state where the front end point and the rear end point indicate positions in different lanes, it is possible to vary the position indicated by the rear end point from the widthwise central position in the travelling lane to the widthwise central position of the vehicle. Thus, it is possible to make it hard for the driver to recognize a variation in the position of the rear end point on the front image, so it is possible to prevent a feeling of strangeness experienced by the driver. Note that, when the vehicle makes a lane change from the recommended lane to a lane other than the recommended lane or when the recommended lane is changed because of a change of a road condition or scheduled travel route, the vehicle shifts from the state where the travelling lane and the recommended lane are the same to the state where the travelling lane and the recommended lane are different.

Furthermore, the determination unit may determine that the vehicle is in the lane change state when the travelling lane is different from the recommended lane and the vehicle is operating to make a lane change from the travelling lane to the recommended lane. By so doing, even when the travelling lane is different from the recommended lane, during a period in which the driver intentionally causes the vehicle to travel in the travelling lane, it is possible to keep the position indicated by the rear end point in the front image at the widthwise central position in the travelling lane, so it is possible to prevent the driver from being unnecessarily alerted as the position indicated by the rear end point follows the position of the vehicle. The operation for making a lane change may be an operation of a direction indicator that indicates a direction toward the recommended lane, changing a steering angle to a direction toward the recommended lane or a predetermined acceleration or deceleration operation. Furthermore, when the vehicle is crossing the separation line between the recommended lane and the traveling lane, of the separation lines of the travelling lane, the determination unit may determine that the vehicle is operating to make a lane change from the travelling lane to the recommended lane. When the vehicle is crossing the separation line between the recommended lane and the travelling lane, of the separation lines of the travelling lane, it may be determined that the vehicle is going to make a lane change with a high probability.

Furthermore, when the vehicle is not in the lane change state, the display control unit may set the position of the rear end point as follows. That is, the display control unit identifies a central line that passes through a midpoint in the horizontal direction of the front image between images of the left and right separation lines of the travelling lane. Then, the rear end point may be set at a position on the central line in the front image. In this way, the position of the rear end point is set on the basis of the recognized images of the left and right separation lines of the travelling lane in the front image, so it is possible to set the position of the rear end point such that the rear end point follows a variation in the position of the image of the travelling lane in the front image.

Furthermore, as in the case of the present invention, the technique for guiding the position of the recommended lane by the guide line superimposed on the front image may also be applied as a program or a method. In addition, the above described lane guidance display system, program and method may be implemented as a sole device or may be implemented by utilizing a component shared with various portions provided for a vehicle, and are implemented in various forms. That is, the units that constitute the lane guidance display system may be distributed to a plurality of hardware devices. When the units are distributed to a plurality of hardware devices, a communication unit that exchanges required data for causing the units to function may be provided. Furthermore, it is possible to provide a navigation system, a navigation method and a navigation program that are provided with at least part of the above described lane guidance display system. In addition, the system described in the above embodiment may be modified where appropriate; for example, part of the system is software or part of the system is hardware. Furthermore, the aspect of the invention may be implemented as a storage medium storing a program that controls the lane guidance display system. It is a matter of course that the storage medium storing software may be a magnetic storage medium or may be a magnetooptical storage medium, and any storage media that will be developed in the future may also be used similarly.

BRIEF DESCRIPTION OF DRAWINGS

FIG. 1 is a block diagram of a navigation system;

FIG. 2A and FIG. 2B are views that respectively illustrate lane change states;

[FIG. 3] FIG. 3A to FIG. 3C are views that respectively show front images;

[FIG. 4] FIG. 4A to FIG. 4C are views that respectively show narrow line-shaped guide lines;

[FIG. 5] FIG. 5A to FIG. 5C are views that respectively show arrow-shaped guide lines;

FIG. 6 is a flowchart of a lane guidance display process;

[FIG. 7] FIG. 7A and FIG. 7B are views that respectively illustrate states where a position of a front end point is corrected; and

FIG. 8 is a view that shows a narrow line-shaped guide line.

DESCRIPTION OF EMBODIMENTS

Figure 1:
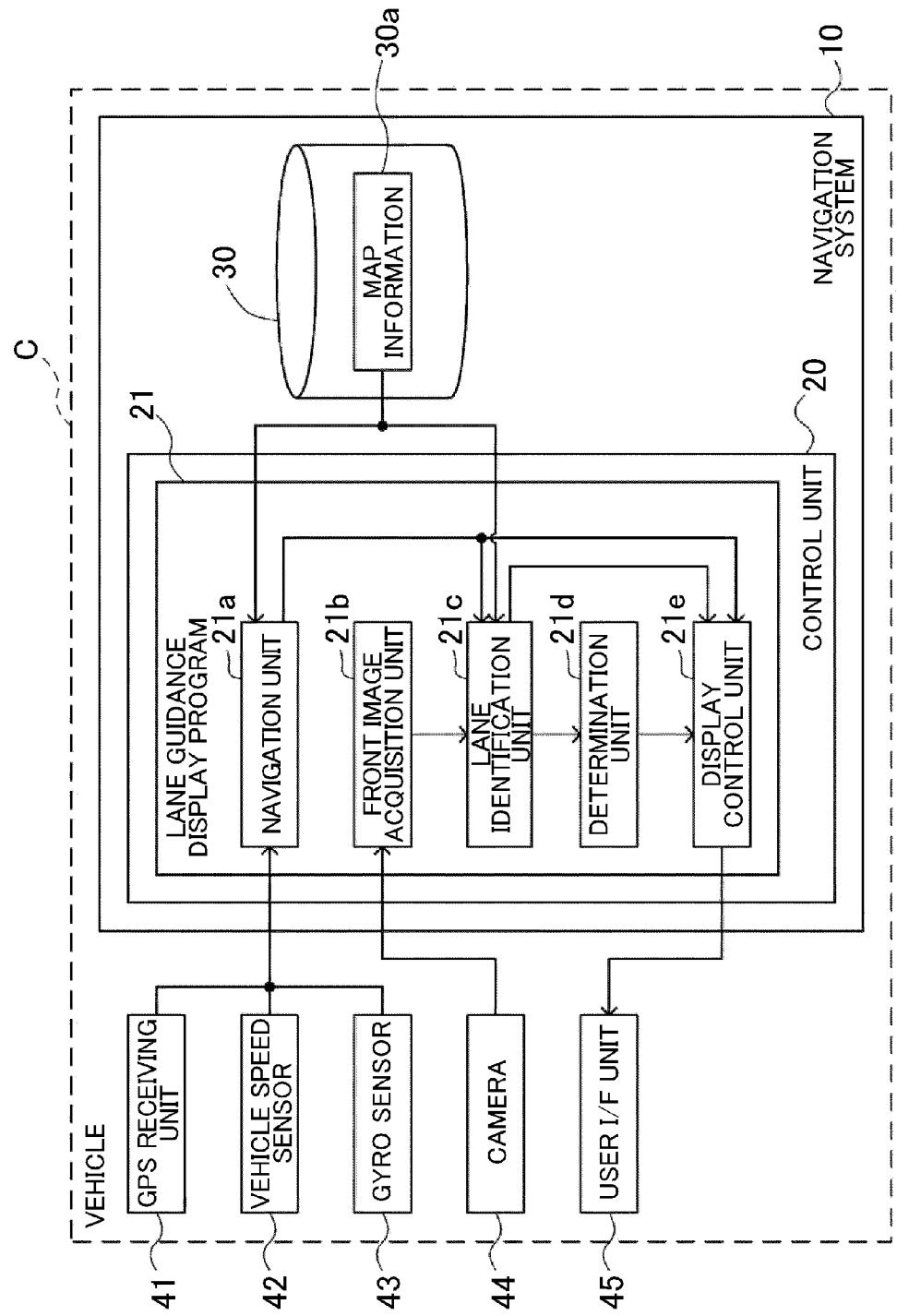
[FIG. 1]

Here, an embodiment of the present invention will be described in accordance with the following sequence.
(1) Configuration of Navigation System
(2) Lane Guidance Display Process
(3) Alternative Embodiments
(1) Configuration of Navigation System FIG. 1 is a block diagram that shows the configuration of a navigation system 10 that serves as a lane guidance display system according to one embodiment of the invention. The navigation system 10 is mounted on a vehicle C. The navigation system 10 includes a control unit 20 and a storage medium 30. The control unit 20 includes a CPU, a RAM, a ROM, and the like, and executes programs stored in the storage medium 30 or the ROM. The storage medium 30 stores map information 30a. The map information 30a includes node data, link data, shape interpolation point data, object data, and the like. The node data indicate nodes set in correspondence with end points (intersections) of roads. The link data indicate information related to a road between the nodes. The shape interpolation point data are used to determine the shape of a road between the nodes. The object data indicate objects present on the roads or around the roads. The link data include lane information that indicates the number of lanes included in a road, a lane number of each lane on a road, counted from one side (left side in the present embodiment) in the width direction, a road that may be entered when the vehicle travels in a lane to the end of a road and a line type (line shape, color, and the like) of a separation line that separates a lane.

In addition, the vehicle C includes a GPS receiving unit 41, a vehicle speed sensor 42, a gyro sensor 43, a camera 44 and a user I/F unit 45. The GPS receiving unit 41 receives electric waves from GPS satellites and outputs a signal for calculating a current position of the vehicle C through an interface (not shown). The vehicle speed sensor 42 outputs a signal corresponding to the rotation speed of wheels equipped for the vehicle C. The gyro sensor 43 outputs a signal corresponding to an angular acceleration of the vehicle C. The camera 44 is an image sensor that captures a front image ahead of the vehicle C.

Figure 2:
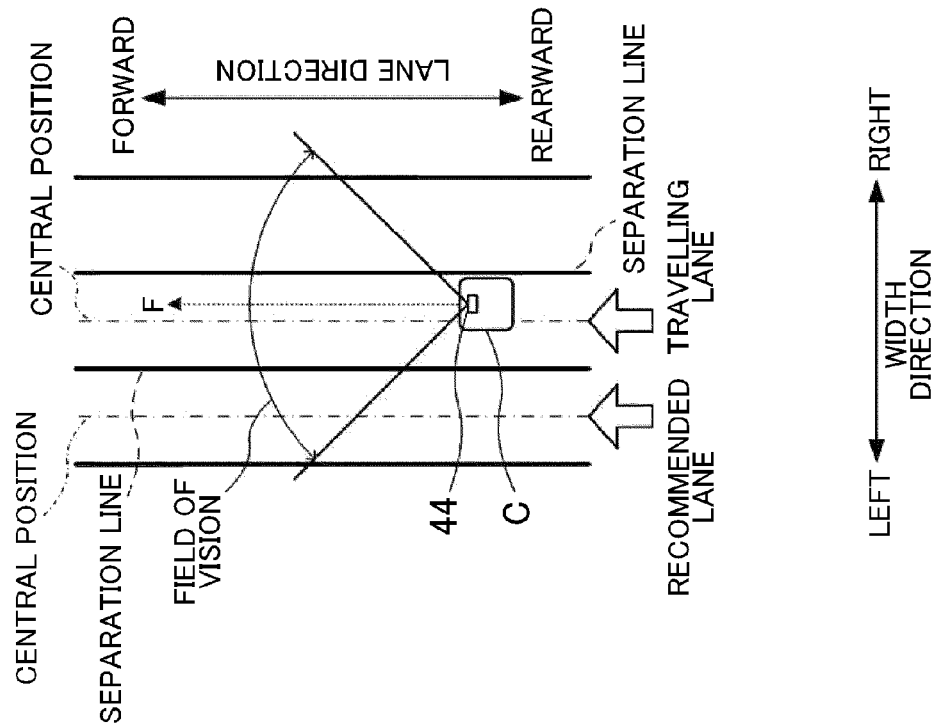
[FIG. 2]
Figure 2:
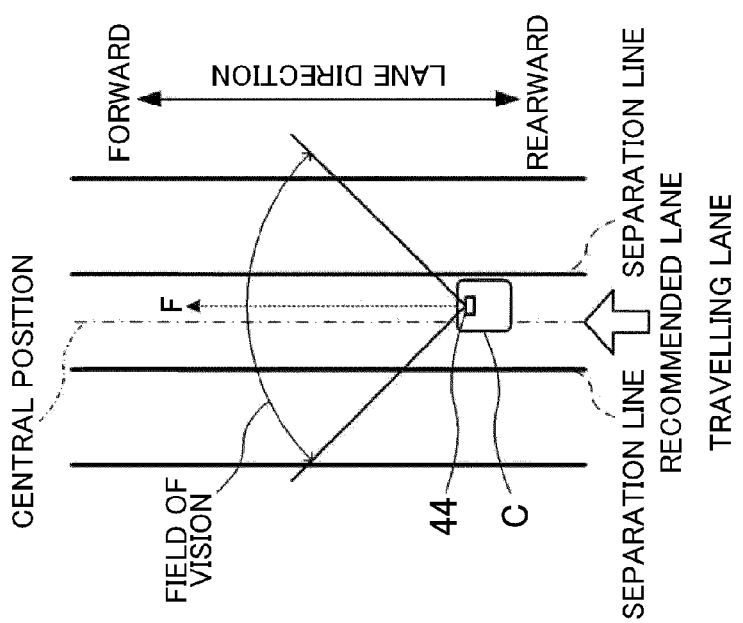

FIG. 2A and FIG. 2B are plan views that respectively show states where the camera 44 captures a front image. As shown in FIG. 2A and FIG. 2B, the camera 44 captures a front image that shows a downward view ahead of the vehicle C in addition to the field of vision ahead of the vehicle C. The front image captured by the camera 44 is output to the control unit 20 via an interface (not shown). In the present embodiment, the camera 44 is provided on the back side of a rear-view mirror at the widthwise central position of the vehicle C. The user I/F unit 45 includes an output device that outputs various pieces of guidance on the basis of control signals output from the control unit 20. The output device of the user I/F unit 45 according to the present embodiment includes a speaker that outputs guidance by voice and a display that serves as a display unit and that displays guidance by image. The display is installed in an orientation in which the driver of the vehicle C is able to visually recognize the display. The display is installed such that the vertical direction and horizontal direction of an image displayed on the display respectively correspond to the vertical direction and horizontal direction of the vehicle C. In addition, in the present embodiment, lane directions of respective lanes captured by the camera 44 all are straight and parallel to each other.

A lane guidance display program 21 includes a navigation unit 21a, a front image acquisition unit 21b, a lane identification unit 21c, a determination unit 21d and a display control unit 21e. The navigation unit 21a is a module that causes the control unit 20 to execute various functions required to guide the vehicle to a destination along a scheduled travel route. With the use of the function of the navigation unit 21a, the control unit 20 identifies the current position of the vehicle C on the basis of, for example, signals output from the GPS receiving unit 41, the vehicle speed sensor 42 and the gyro sensor 43. Then, with the use of the function of the navigation unit 21a, the control unit 20 consults the link data of the map information 30a to identify a road, on which the current position of the vehicle C is present, as a travel road. In addition, with the use of the function of the navigation unit 21a, the control unit 20 consults the map information 30a to search for a scheduled travel route from the current position to the destination through a known route search method. In the present embodiment, it is assumed that the scheduled travel route is found in advance. Note that, with the use of the function of the navigation unit 21a, the control unit 20 just needs to be able to acquire a scheduled travel route and may acquire a scheduled travel route found by an external computer through communication.

The front image acquisition unit 21b is a module that causes the control unit 20 to execute the function of acquiring a front image obtained by capturing an area ahead of the vehicle C. That is, with the use of the function of the front image acquisition unit 21b, the control unit 20 successively acquires front image data captured by the camera 44 at predetermined time intervals.

FIG. 3A to FIG. 3C are views that respectively show front images. When the vehicle C travels horizontally, the vertical upper side on a bisector that transversely bisects a front image indicates a forward position F ahead of the camera 44 (the widthwise central position of the vehicle C). Note that a vanishing point is present on the bisector that transversely bisects the front image. When the vehicle C travels horizontally, the transverse position of the front image corresponds to the horizontal position in the field of vision of the camera 44, and particularly corresponds to a position in the lane width direction in a lane. On the other hand, the vertical position of the front image depends on a vertical position in the field of vision and a distance from the camera 44. Thus, as the vertical position of the front image becomes higher, it indicates a farther position ahead in a travelling direction of the vehicle C. In the present embodiment, it is assumed that the midpoint CC of the lower side of the front image indicates the widthwise central position of the vehicle C.

The lane identification unit 21c is a module that causes the control unit 20 to execute the function of identifying a travelling lane in which the vehicle C is currently travelling and a recommended lane in which the vehicle C should travel in the front image. That is, with the use of the function of the lane identification unit 21c, the control unit 20 recognizes images of lane separation lines from the front image through a known line recognition method, such as Hough transform, and identifies areas separated by the images of the separation lines as images of lanes. Note that, with the use of the function of the lane identification unit 21c, the control unit 20 may consult line types of separation lines, indicated by lane information of the map information 30a, to recognize images of separation lines. Furthermore, with the use of the function of the lane identification unit 21c, the control unit 20 identifies the image of the lane closest from the midpoint CC of the lower side of the front image among the images of the lanes as the image of a travelling lane. In addition, with the use of the function of the lane identification unit 21c, the control unit 20 counts from the image of the left-end lane to the image of the travelling lane in the front image to identify a lane number of the travelling lane.

In addition, with the use of the function of the lane identification unit 21c, the control unit 20 identifies a recommended lane on the basis of the scheduled travel route found in advance with the use of the function of the navigation unit 21a. That is, with the use of the function of the lane identification unit 21c, the control unit 20 identifies a road on which the vehicle C should travel subsequently to the currently travelling road in the scheduled travel route, and identifies a lane, which allows the vehicle C to enter the subsequent road, as a recommended lane. Then, with the use of the function of the lane identification unit 21c, the control unit 20 identifies the image of the lane obtained by counting by the lane number of the recommended lane sequentially from the image of the left-end lane in the front image as the image of the recommended lane.

The determination unit 21d is a module that causes the control unit 20 to execute the function of determining whether the vehicle C is in a lane change state where the vehicle C makes a lane change from the travelling lane to the recommended lane. With the use of the function of the determination unit 21d, the control unit 20 determines that the vehicle C is in the lane change state when the travelling lane identified with the use of the function of the lane identification unit 21c is different from the recommended lane, that is, the lane number of the recommended lane is not equal to the lane number of the travelling lane.

FIG. 2A shows an example in the case where the travelling lane and the recommended lane both are a central lane among three lanes that constitute a travelling road and the vehicle C is not in the lane change state. Hereinafter, the case where the vehicle C is not in the lane change state is referred to as lane keeping state. FIG. 2B shows an example in the case where the travelling lane is a central lane and the recommended lane is a left-end lane among three lanes that constitute a travelling road and the vehicle C is in the lane change state. FIG. 3A shows a front image in the case of FIG. 2A. FIG. 3B shows a front image in the case of FIG. 2B. In the front image of FIG. 3B, the image of the central lane is the image of the travelling lane (upward-sloping hatching), and the image of the left-end lane is the image of the recommended lane (downward-sloping hatching). On the other hand, in the front image of FIG. 3A, the image of the central lane is the image of the travelling lane and is the image of the recommended lane (cross hatching).

Furthermore, in the case of the lane change state, with the use of the function of the determination unit 21d, the control unit 20 determines whether the vehicle C is crossing the separation line between the recommended lane and the travelling lane, of the separation lines of the travelling lane. With the use of the function of the determination unit 21d, the control unit 20 identifies a position, offset by a predetermined distance T from the midpoint CC of the lower side of the front image toward the image of the recommended lane, on the lower side as a wheel point E that indicates the position of the wheels closer to the recommended lane. Note that the predetermined distance T corresponds to half the width of the vehicle C. With the use of the function of the determination unit 21d, the control unit 20 determines that the vehicle C is not crossing the separation line between the recommended lane and the travelling lane, of the separation lines of the travelling lane, when the wheel point E is located in the image of the travelling lane with respect to a position G of the intersection of the image BL of the separation line between the image of the recommended lane and the image of the travelling lane, of the images BL of the separation lines of the travelling lane, and the lower side of the front image (FIG. 3B). Note that the state where the vehicle C is not crossing the separation line between the recommended lane and the travelling lane, of the separation lines of the travelling lane, is referred to as pre-start state. On the other hand, with the use of the function of the determination unit 21d, the control unit 20 determines that the vehicle C is crossing the separation line between the recommended lane and the travelling lane, of the separation lines of the travelling lane, when the wheel point E is equal to the position G of the intersection of the image BL of the separation line between the image of the recommended lane and the image of the travelling lane, of the images BL of the separation lines of the travelling lane, and the lower side of the front image or is located on the image of the recommended lane with respect to the position G of the intersection (FIG. 3C). Note that the state where the vehicle C is crossing the separation line between the recommended lane and the travelling lane, of the separation lines of the travelling lane, is referred to as post-start state. In addition, with the use of the function of the determination unit 21d, the control unit 20 determines that the vehicle C is in the post-start state from when the vehicle C initially crosses the separation line between the recommended lane and the travelling lane, of the separation lines of the travelling lane, until a lane change to the recommended lane is completed. With the use of the function of the determination unit 21*d*, the control unit 20 may determine that a lane change is completed on the basis of the fact that, for example, the vehicle C travels within a predetermined distance from the central position of the recommended lane in the width direction. With the use of the function of the determination unit 21*d*, the control unit 20 determines that the vehicle C is in the lane keeping state when the lane change is completed.

The display control unit 21*e* is a module that causes the control unit 20 to execute the function of generating a guide line, superimposing the generated guide line on the front image and causing the user I/F unit 45 to display the generated guide line continuously. Specifically, with the use of the function of the display control unit 21*e*, the control unit 20 executes the process of causing the user I/F unit 45 to display a front image on which the guide line is superimposed each time the front image is acquired at a predetermined time interval. Note that, in any front image captured at any time interval, the midpoint CC of the lower side of the front image constantly indicates the widthwise central position of the vehicle C. In addition, when the vehicle C moves in the lane width direction, the images of the separation lines of the lanes move horizontally in the front image.

With the use of the function of the display control unit 21*e*, the control unit 20 generates a guide line that has a rear end point indicating a position at which the vehicle C is currently travelling as a rear end point and a front end point indicating a position forward of the rear end point in the recommended lane as a front end point. Hereinafter, the points that constitute the guide line will be described in detail.

point in the front image such that the front end point indicates the widthwise central position in the recommended lane.

With the use of the function of the display control unit 21*e*, the control unit 20 identifies a central line RC (alternate long and short dash line) that passes the midpoints between the images BL of the left and right separation lines of the recommended lane in the horizontal direction on the front image. With the use of the function of the display control unit 21*e*, the control unit 20 identifies midpoints (white triangles) in the horizontal direction between intersections (white circles) of horizontal auxiliary lines O (alternate long and two short dashes lines) and the images BL of the left and right separation lines of the recommended lane on the front image as shown in FIG. 3A to FIG. 3C, and determines that the midpoints indicate the widthwise central positions in the recommended lane. With the use of the function of the display control unit 21*e*, the control unit 20 identifies midpoints (white triangles) in the horizontal direction between the images BL of the left and right separation lines of the recommended lane for each of two or more auxiliary lines O having different positions in the vertical direction, and identifies a line that connects the midpoints (white triangles) as a central line RC that indicates the widthwise central positions in the recommended lane. Note that, when the recommended lane is not straight, a midpoint (white triangle) in the horizontal direction between the images BL of the left and right separation lines of the recommended lane may be identified for each of three or more auxiliary lines O, and a curve or a polygonal line that connects the midpoints (white triangles) may be identified as a central line RC.

FIG. 4A to FIG. 4C are views that respectively show states where a front end point is set in each of the front images of FIG. 3A to FIG. 3C. With the use of the function of the display control unit 21*e*, the control unit 20 sets a front end point FE at a position on the central line RC of the recommended lane

TABLE 1

| State of Vehicle | Not Lane Change State (Lane Keeping State) | Lane Change State | |
|---|---|---|---|
| | | Pre-start State | Post-start State |
| Front End Point | Widthwise Central Position in Recommended Lane | Widthwise Central Position in Recommended Lane | Widthwise Central Position in Recommended Lane |
| Rear End Point | Widthwise Central Position in Travelling Lane | Widthwise Central Position of Vehicle | Widthwise Central Position of Vehicle |
| First Change Point | None | Rearward of Front End Point and Forward of Rear End Point in Recommended Lane (Length of Recommended Lane-side Straight Portion Is Set to Predetermined Value) | Rearward of Front End Point and Forward of Rear End Point in Recommended Lane (Length of Recommended Lane-side Straight Portion Is Set to Predetermined Value) |
| Second Change Point | None | Rearward of First Change Point and Forward of Rear End Point in Travelling Lane (Acute Angle Is Set to Predetermined Angle) | None |

Table 1 shows positions indicated by the points that constitute the guide line in an actual space. As shown in Table 1, in any of the pre-start state and post-start state of the lane change state and the lane keeping state, with the use of the function of the display control unit 21*e*, the control unit 20 sets a front end in the front image and at a set position H in the vertical direction on the front image. As shown in FIG. 4A to FIG. 4C, in any of the pre-start state and post-start state of the lane change state and the lane keeping state, with the use of the function of the display control unit 21*e*, the control unit 20 generates an auxiliary line S in the horizontal direction at the set position H in the vertical direction on the front image, and sets the front end point FE at the intersection of the auxiliary line S and the central line RC of the recommended lane. Thus, in any of the pre-start state and post-start state of the lane change state and the lane keeping state, the front end point indicates a position inside the recommended lane. In addition, the set position H is not dependent on the front image.

As shown in Table 1, with the use of the function of the display control unit 21e, the control unit 20 sets the position of the rear end point in the front image such that the rear end point indicates the widthwise central position in the travelling lane in the lane keeping state. With the use of the function of the display control unit 21e, the control unit 20 identifies a central line UC (alternate long and short dash line) that passes through midpoints between the images BL of the left and right separation lines of the travelling lane in the front image. However, as shown in FIG. 3A, the travelling lane coincides with the recommended lane in the lane keeping state, so the central line UC of the travelling lane coincides with the central line RC of the recommended lane identified at the time of setting the front end point FE. As shown in FIG. 4A, in the lane keeping state, with the use of the function of the display control unit 21e, the control unit 20 sets a rear end point BE at the intersection of the central line UC of the travelling lane and the lower side of the front image. Note that in the lane keeping state in which no lane change is performed, it is presumable that the vehicle C travels substantially the widthwise central position in the travelling lane. Thus, it is presumable that, in the lane keeping state, the rear end point BE set on the central line UC of the travelling lane at the lower side of the front image indicates the position at which the vehicle C is currently travelling.

As shown in Table 1, with the use of the function of the display control unit 21e, the control unit 20 sets a rear end point in the front image such that the rear end point indicates the widthwise central position of the vehicle C in each of the pre-start state and post-start state of the lane change state. As described above, the midpoint CC of the lower side of the front image indicates the widthwise central position of the vehicle C. Thus, as shown in FIG. 4B and FIG. 4C, in any of the pre-start state and the post-start state, with the use of the function of the display control unit 21e, the control unit 20 sets the rear end point BE at the midpoint CC of the lower side of the front image.

As shown in Table 1, with the use of the function of the display control unit 21e, the control unit 20 sets only the front end point FE and the rear end point BE without setting a first change point and a second change point in the lane keeping state. As shown in FIG. 4A, with the use of the function of the display control unit 21e, the control unit 20 generates a linear and narrow line-shaped guide line GL that connects the front end point FE to the rear end point BE in the lane keeping state.

On the other hand, as shown in Table 1, with the use of the function of the display control unit 21e, the control unit 20 sets a first change point and a second change point in the pre-start state of the lane change state, and sets a first change point in the post-start state of the lane change state. As shown in FIG. 4B and FIG. 4C, in the pre-start state and post-start state of the lane change state, with the use of the function of the display control unit 21e, the control unit 20 sets a first change point K1 that indicates a position rearward of the front end point FE and forward of the rear end point BE within the recommended lane. Specifically, with the use of the function of the display control unit 21e, the control unit 20 sets the first change point K1 at a position vertically downward of the front end point FE and vertically upward of the lower side of the front image on the central line RC of the recommended lane in the front image. Furthermore, with the use of the function of the display control unit 21e, the control unit 20 sets the first change point K1 such that the length of a recommended lane-side guide line portion RL that connects the front end point FE to the first change point K1 is equal to a predetermined value Y. Note that the predetermined value Y is not dependent on the front image. Note that the recommended lane-side guide line portion RL is a line on the central line RC of the recommended lane, so the recommended lane-side guide line portion RL indicates the lane direction of the recommended lane.

As shown in Table 1, with the use of the function of the display control unit 21e, the control unit 20 does not set a second change point in the post-start state of the lane change state. As shown in FIG. 4C, with the use of the function of the display control unit 21e, the control unit 20 generates a polygonal and narrow line-shaped guide line GL that connects the front end point FE, the first change point K1 and the rear end point BE in the post-start state of the lane change state. In this case, the guide line GL includes a recommended lane-side guide line portion RL between the front end point FE and the first change point K1 and a crossing line portion CL between the first change point K1 and the rear end point BE. Note that the crossing line portion CL may be a straight line or curve that connects the first change point K1 to the rear end point BE. In addition, the recommended lane-side guide line portion RL just needs to be entirely present inside the image of the recommended lane and may be a curve.

As shown in FIG. 4B, in the pre-start state of the lane change state, with the use of the function of the display control unit 21e, the control unit 20 sets a second change point K2 that indicates a position rearward of the first change point K1 and forward of the rear end point BE within the travelling lane. That is, with the use of the function of the display control unit 21e, the control unit 20 sets, in the front image, the second change point K2 at a position vertically downward of the first change point K1 and vertically upward of the lower side of the front image. In addition, with the use of the function of the display control unit 21e, the control unit 20 equalizes an acute angle Z made between the image BL of the separation line between travelling lane and the recommended lane and a line (crossing line portion CL) that connects the first change point K1 to the second change point K2 in the front image to a predetermined angle. In the present embodiment, with the use of the function of the display control unit 21e, the control unit 20 sets a second change point K2 on a bisector that transversely bisects the front image. That is, the second change point K2 is set so as to indicate the position of the forward position F ahead of the widthwise central position of the vehicle C. In addition, the predetermined angle is not dependent on the front image. It is more desirable that the predetermined angle is close to 90 degrees. In the present embodiment, the predetermined angle is 60 degrees. The acute angle Z indicates each of two angles smaller than 90 degrees among four angles formed around the intersection of the image BL of the separation line present between the travelling lane and the recommended lane and a line (crossing line portion CL) that connects the first change point K1 to the second change point K2.

As shown in FIG. 4B, with the use of the function of the display control unit 21e, the control unit 20 generates a polygonal and narrow line-shaped guide line GL that connects the front end point FE, the first change point K1, the second change point K2 and the rear end point BE in the pre-start state of the lane change state. In this case, the guide line GL includes a recommended lane-side guide line portion RL between the front end point FE and the first change point K1, a crossing line portion CL that connects the first change point K1 to the second change point K2 and an adjacent portion AL between the second change point K2 and the rear end point BE. Note that the crossing line portion CL in the pre-start state may also be a straight line or curve that connects the first change point K1 to the second change point K2.

With the use of the function of the display control unit 21e, the control unit 20 generates an arrow-shaped guide line gl on the basis of the narrow line-shaped guide line GL. FIG. 5A to FIG. 5C are views that respectively show states where an arrow-shaped guide line gl is drawn on the basis of each of the narrow line-shaped guide lines GL in FIG. 4A to FIG. 4C. In the present embodiment, the arrow-shaped guide line gl is generated so as to be symmetrical with respect to the narrow line-shaped guide line GL. The head of the arrow is isosceles triangular, and the vertex of the triangle corresponds to the front end point FE. In the present embodiment, "a vertex" denotes the corner corresponding to the vertex angle of an isosceles triangle and "a base vertex" denotes one of the corners corresponding to the base angles of an isosceles triangle.

With the use of the function of the display control unit 21e, the control unit 20 causes the user I/F unit 45 to display the front image on which the arrow-shaped guide line gl is superimposed. With the use of the function of the display control unit 21e, for each of front images acquired successively at time intervals, the control unit 20 generates an arrow-shaped guide line gl in synchronization with the front image and successively updates the front image on which the arrow-shaped guide line gl is superimposed.

In the above configuration, with the use of the function of the display control unit 21e, the control unit 20 keeps the position of the front end point FE in the vertical direction of the front image at the set position H, so it is possible to prevent a vertical change in the position of the front end point FE of the guide line gl in the front image. Thus, it is possible to make it easy to recognize the position of the recommended lane indicated by the front end point FE of the guide line gl. That is, by keeping the position of the front end point FE constant in the vertical direction of the front image, it is possible to prevent such a feeling of strangeness that the position indicated by the front end point FE approaches or moves away.

In addition, with the use of the function of the display control unit 21e, the control unit 20 generates a guide line gl such that the length of the recommended lane-side guide line portion RL in the front image is kept at the predetermined value Y. By so doing, it is possible to ensure the predetermined value Y for the length of the recommended lane-side guide line portion RL that indicates the position inside the recommended lane, so it is possible to make it easy to recognize the recommended lane. Note that, with the use of the function of the display control unit 21e, the control unit 20 sets the direction of the recommended lane-side guide line portion RL in the same direction as that of the central line RC of the recommended lane in the front image. By so doing, the driver is able to easily recognize the lane direction of the recommended lane.

Furthermore, with the use of the function of the display control unit 21e, the control unit 20 generates the guide line gl such that the acute angle Z made between the image BL of the separation line present between the travelling lane and the recommended lane and a line (crossing line portion CL) that connects the first change point K1 to the second change point K2 in the front image is larger than or equal to the predetermined angle (60 degrees). By so doing, it is possible to set the acute angle Z made between the image BL of the separation line present between the travelling lane and the recommended lane and the line (crossing line portion CL) that connects the first change point K1 to the second change point K2 to an angle closer to a right angle than the predetermined angle, and the driver is able to clearly recognize that a lane change should be made across the separation line present between the travelling lane and the recommended lane.

Furthermore, in each of the pre-start state and post-start state of the lane change state, with the use of the function of the display control unit 21e, the control unit 20 sets the position of the rear end point BE in the front image such that the rear end point BE indicates the widthwise central position of the vehicle C. By so doing, it is possible for the rear end point BE of the guide line gl to constantly indicate the widthwise central position of the vehicle C in the front image. Thus, it is possible to vary the position indicated by the rear end point BE of the guide line gl such that the position indicated by the rear end point BE follows the widthwise central position of the vehicle C, which varies with a lane change. That is, it is possible to move the position indicated by the rear end point BE of the guide line gl from the image of the travelling lane to the image of the recommended lane in the front image following the widthwise central position of the vehicle C that moves from the travelling lane side to the recommended lane side with a lane change. Thus, it is possible to superimpose the guide line gl appropriate to the progress of a lane change on the front image. Note that, in the present embodiment, in the lane change state, the absolute position of the rear end point BE in the front image is fixed at the midpoint CC of the lower side, but the rear end point BE relatively moves with respect to the images of the travelling lane and recommended lane such that the rear end point BE follows the widthwise central position of the vehicle C. By making a comparison between FIG. 5B and FIG. 5C that respectively show the front images in the lane change state, the image BL of the separation line of the travelling lane and the image BL of the separation line of the recommended lane is shifted more rightward with respect to the midpoint CC in FIG. 5C than in FIG. 5B, and the driver is able to recognize that the widthwise central position of the vehicle C is varying in the lane change state.

On the other hand, not in the lane change state but in the state where the vehicle C continuously travels in the travelling lane, when the widthwise central position of the vehicle C varies, it may be assumed that the position in the width direction of the vehicle C is just varied due to sway of the vehicle C, which is not intended by the driver. In this way, when the position in the width direction, indicated by the rear end point BE of the guide line gl, varies following sway of the vehicle C, which is not intended by the driver, the driver is unnecessarily alerted. Then, with the use of the function of the display control unit 21e, the control unit 20 sets the position of the rear end point BE in the front image such that the rear end point BE indicates the widthwise central position in the travelling lane in the case where it is not in the lane change state. By so doing, it is possible for the rear end point BE not to approach or move away from the images BL of the separation lines of the travelling lane following sway of the vehicle C, so it is possible to prevent a decrease in the visibility of the guide line gl. Furthermore, it is possible to prevent the driver from being unnecessarily alerted.

In addition, with the use of the function of the determination unit 21d, the control unit 20 determines that the vehicle C is in the lane change state when the travelling lane is different from the recommended lane. By so doing, in synchronization with the timing at which it changes from the state where the front end point FE and the rear end point BE indicate positions in the same lane to the state where the front end point FE and the rear end point BE indicate positions in different lanes, it is possible to vary the position indicated by the rear end point BE from the widthwise central position in the travelling lane to the widthwise central position of the vehicle C. Thus, it is possible to make it hard for the driver to recognize a variation in the position of the rear end point on the front image, so it is possible to prevent a feeling of strangeness experienced by the driver.

Furthermore, with the use of the function of the display control unit 21e, the control unit 20 identifies a central line RC that passes through the midpoints between the images of the left and right separation lines of the recommended lane in the horizontal direction of the front image, and sets the position of the front end point FE to a position on the central line RC of the recommended lane in the front image at a set position H in the vertical direction of the front image. In this way, the position of the front end point FE is set on the basis of the recognized images BL of the left and right separation lines of the recommended lane in the front image, so it is possible to set the position of the front end point FE such that the front end point FE follows a variation in the front image updated successively. However, the position of the front end point FE is set to the set position H in the vertical direction of the front image, so it is possible to keep the position of the front end point constant in the vertical direction of the front image.

With the use of the function of the display control unit 21e, in the case where it is not in the lane change state, the control unit 20 identifies the central line RC that passes through the midpoints between the images of the left and right separation lines of the travelling lane in the horizontal direction of the front image, and set the position of the rear end point BE to a position on the central line UC of the travelling lane in the front image and on the lower side of the front image. In this way, the position of the rear end point BE is set on the basis of the recognized images BL of the left and right separation lines of the travelling lane in the front image, so it is possible to set the position of the rear end point BE such that the rear end point BE follows a variation in the position of the image of the travelling lane in the front image.

(2) Lane Guidance Display Process

Figure 6:
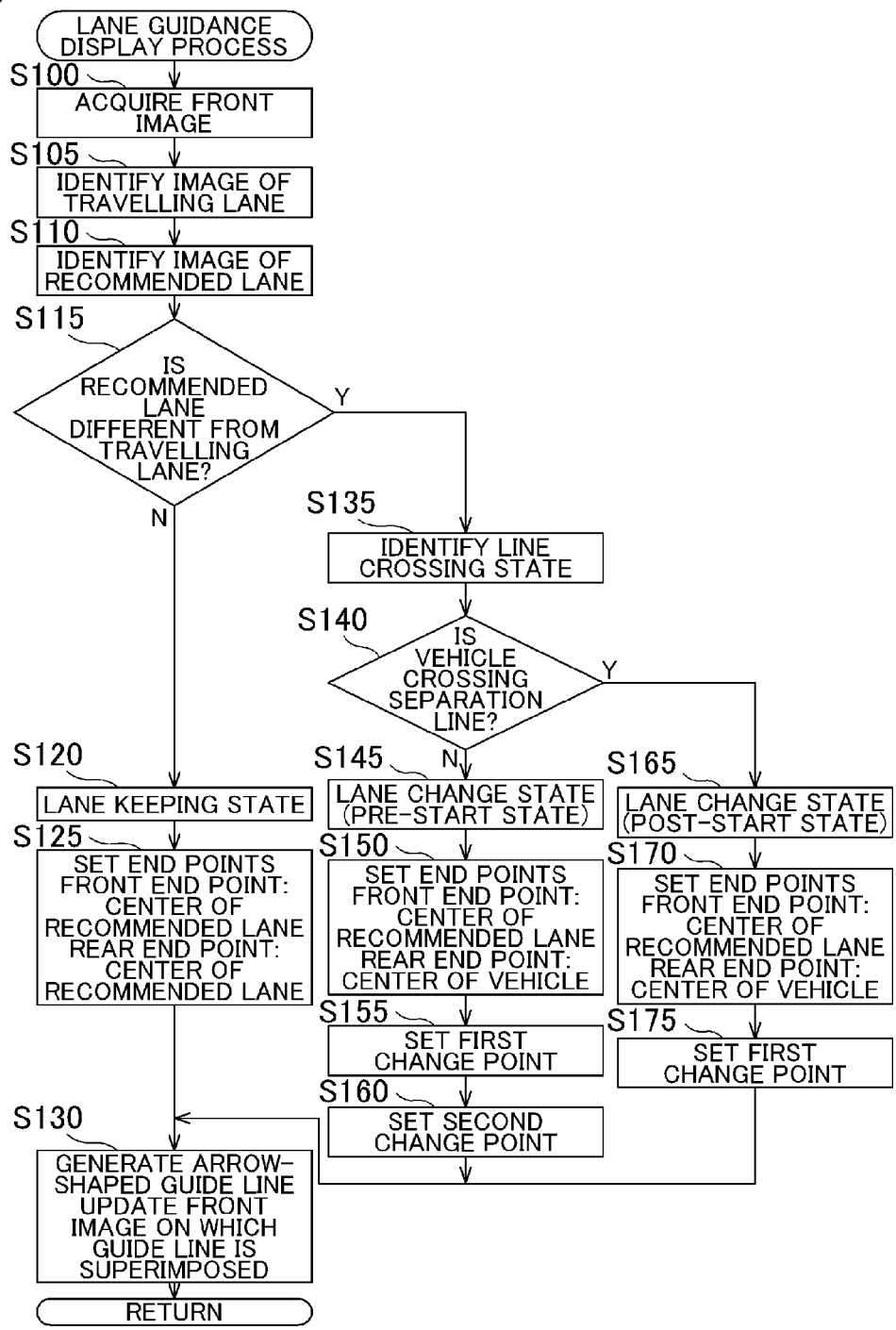
[FIG. 6]

Next, a lane guidance display process executed by the function of the lane guidance display program 21 will be described. FIG. 6 is a flowchart of the lane guidance display process. The lane guidance display process is a loop process that is executed by the control unit 20 with the use of the function of the front image acquisition unit 21b each time a front image is acquired at a predetermined time interval. With the use of the function of the front image acquisition unit 21b, the control unit 20 acquires the front image captured by the camera 44 (S100). Subsequently, with the use of the function of the lane identification unit 21c, the control unit 20 identifies the image of a travelling lane in which the vehicle C is currently travelling in the front image (S105). Specifically, with the use of the function of the lane identification unit 21c, the control unit 20 identifies the image of a lane closest to the midpoint CC of the lower side of the front image, indicating the widthwise central position of the vehicle C, among the images of lanes identified through recognition of the images of separation lines in the front image, as the image of the travelling lane. Furthermore, with the use of the function of the lane identification unit 21c, the control unit 20 identifies the image of a recommended lane in which the vehicle C should travel in the front image (S110). Specifically, with the use of the function of the lane identification unit 21c, the control unit 20 identifies the lane number of the recommended lane on a travelling road on the basis of a scheduled travel route found in advance. Then, with the use of the function of the lane identification unit 21c, the control unit 20 identifies the image of a lane corresponding to the lane number of the recommended lane among the images of the lanes identified in the front image, as the image of the recommended lane.

Subsequently, with the use of the function of the determination unit 21d, the control unit 20 determines whether the travelling lane is different from the recommended lane (S115). Specifically, with the use of the function of the determination unit 21d, the control unit 20 determines whether the lane number of the travelling lane is different from the lane number of the recommended lane. When it is not determined that the travelling lane is different from the recommended lane, with the use of the function of the determination unit 21d, the control unit 20 determines that it is in the lane keeping state (S120).

When it is determined that the vehicle C is in the lane keeping state, with the use of the function of the display control unit 21e, the control unit 20 sets the front end point FE and the rear end point BE such that the front end point FE and the rear end point BE indicate the widthwise central position in the recommended lane (S125). That is, with the use of the function of the display control unit 21e, the control unit 20 sets the front end point FE to a position on the central line RC of the recommended lane in the front image at the set position H in the vertical direction of the front image, and sets the rear end point BE to a position on the central line UC of the travelling lane (central line RC of the recommended lane) in the front image at a position on the lower side of the front image (FIG. 4A).

Subsequently, with the use of the function of the display control unit 21e, the control unit 20 updates the front image on which an arrow-shaped guide line gl is superimposed and causes the user I/F unit 45 to display the updated front image (S130, FIG. 5A). Specifically, with the use of the function of the display control unit 21e, the control unit 20 generates a linear guide line GL that connects the front end point FE to the rear end point BE, generates an arrow-shaped guide line gl that is symmetrical with respect to the guide line GL, and superimposes the guide line gl on the front image. During a period in which the vehicle C is in the lane keeping state, steps S125 to S130 are repeatedly executed, and the arrow-shaped guide line gl becomes a linear guide line gl that connects the front end point FE to the rear end point BE, the front end point FE and the rear end point BE being constantly located on the central line UC of the travelling lane (=recommended lane). The arrow-shaped guide line gl does not approach or move away from the images BL of the separation lines of the travelling lane in accordance with the position of the vehicle C, so it is possible to prevent a decrease in the visibility of the guide line gl in the lane keeping state where the driver does not intend to make a lane change. Furthermore, it is possible to prevent the driver from being unnecessarily alerted. In addition, because the front end point FE is kept at the set position H in the vertical direction of the front image, the position of the recommended lane indicated by the front end point FE is easily recognized.

When it is determined in step S115 that the travelling lane is different from the recommended lane, with the use of the function of the determination unit 21d, the control unit 20 determines that the vehicle C is in a line crossing state (S135). That is, with the use of the function of the determination unit 21d, the control unit 20 identifies a relative positional relationship between a wheel point E that indicates the position of wheels closer to the recommended lane and a position G of the image BL of the separation line between the image of the recommended lane and the image of the travelling lane, of the images BL of the separation lines of the travelling lane, on the lower side of the front image (FIG. 3B and FIG. 3C). Then, with the use of the function of the determination unit 21d, the control unit 20 determines whether the vehicle C is crossing the separation line between the recommended lane and the travelling lane, of the separation lines of the travelling lane (S140). Specifically, with the use of the function of the determination unit 21d, the control unit 20 determines that the vehicle C is not crossing the separation line between the recommended lane and the travelling lane, of the separation lines of the travelling lane, when the wheel point E is located on the image of the travelling lane with respect to the position G of the image BL of the separation line between the image of the recommended lane and the image of the travelling lane, of the images BL of the separation lines of the travelling lane, on the lower side of the front image (FIG. 3B). On the other hand, when the wheel point E is equal to the position G of the image BL of the separation line between the image of the recommended lane and the image of the travelling lane, of the images BL of the separation lines of the travelling lane, or located on the image of the recommended lane with respect to the position G on the lower side of the front image, it is determined that the vehicle C is crossing the separation line between the recommended lane and the travelling lane, of the separation lines of the travelling lane (FIG. 3C).

When it is not determined in step S140 that the vehicle C is crossing the separation line between the recommended lane and the travelling lane, of the separation lines of the travelling lane, with the use of the function of the determination unit 21d, the control unit 20 determines that the vehicle C is in the pre-start state of the lane change state (S145). When it is determined that the vehicle C is in the pre-start state, with the use of the function of the display control unit 21e, the control unit 20 sets the front end point FE such that the front end point FE indicates the widthwise central position in the recommended lane, and sets the rear end point BE such that the rear end point BE indicates the widthwise central position of the vehicle C (S150). That is, with the use of the function of the determination unit 21d, the control unit 20 sets the front end point FE at a position on the central line RC of the recommended lane in the front image at the set position H in the vertical direction of the front image, and sets the rear end point BE at the midpoint CC of the lower side of the front image (FIG. 4B).

Subsequently, with the use of the function of the display control unit 21e, the control unit 20 sets the first change point K1 (S155). Specifically, with the use of the function of the display control unit 21e, the control unit 20 sets the first change point K1 at a position vertically downward of the front end point FE and upward of the lower side of the front image on the central line RC of the recommended lane in the front image. Furthermore, with the use of the function of the display control unit 21e, the control unit 20 sets the first change point K1 such that the length of the recommended lane-side guide line portion RL that connects the front end point FE to the first change point K1 is equal to the predetermined value Y (FIG. 4B). Subsequently, with the use of the function of the display control unit 21e, the control unit 20 sets the second change point K2 (S160). Specifically, with the use of the function of the display control unit 21e, the control unit 20 sets the second change point K2 at a position vertically downward of the first change point K1 and vertically upward of the lower side of the front image such that the acute angle Z made between the image BL of the separation line present between the travelling lane and the recommended lane and a line (crossing line portion CL) that connects the first change point K1 to the second change point K2 is equal to the predetermined angle (60 degrees) in the front image. More specifically, with the use of the function of the display control unit 21e, the control unit 20 sets the second change point K2 on a bisector that transversely bisects the front image (FIG. 4B).

Then, with the use of the function of the display control unit 21e, the control unit 20 updates the front image on which the arrow-shaped guide line gl is superimposed, and causes the user I/F unit 45 to display the updated front image (S130, FIG. 5B). During a period in which the vehicle C is in the pre-start state of the lane change state, steps S150 to S160 and S130 are repeatedly executed, and the arrow-shaped guide line gl becomes a polygonal guide line gl that connects the front end point FE located on the central line RC of the recommended lane, the first change point K1, the second change point K2 and the rear end point BE at the midpoint CC of the lower side of the front image, the midpoint CC indicating the widthwise central position of the vehicle C. By so doing, in the pre-start state where the driver intends to make a lane change, it is possible to relatively move the rear end point BE that indicates the position at which the vehicle C is currently travelling in the arrow-shaped guide line gl with respect to the images BL of the separation lines of the travelling lane so as to follow a variation in the central position of the vehicle C. In addition, in the pre-start state as well, because the front end point FE is kept at the set position H in the vertical direction of the front image, the position of the recommended lane, indicated by the front end point FE, is easily recognized. Furthermore, in the pre-start state, because the length of the recommended lane-side guide line portion RL that indicates a position within the recommended lane is kept at the predetermined value Y, it is possible to make it easy to recognize the position of the recommended lane and the lane direction of the recommended lane, which are indicated by the recommended lane-side guide line portion RL. In addition, because the acute angle Z made between the image BL of the separation line present between the travelling lane and the recommended lane and the line (crossing line portion CL) that connects the first change point K1 to the second change point K2 is made equal to the predetermined angle (60 degrees), the driver is able to clearly recognize that a lane change should be made across the separation line present between the travelling lane and the recommended lane.

When it is determined in step S140 that the vehicle C is crossing the separation line between the recommended lane and the travelling lane, of the separation lines of the travelling lane, with the use of the function of the determination unit 21d, the control unit 20 determines that the vehicle C is in the post-start state in the lane change state (S165). When it is determined that the vehicle C is in the post-start state, with the use of the function of the display control unit 21e, the control unit 20 sets the front end point FE and the rear end point BE (S170, FIG. 4C) as in the case of the pre-start state (S150). Subsequently, with the use of the function of the display control unit 21e, the control unit 20 sets the first change point K1 (S175, FIG. 4C) as in the case of the pre-start state (S155).

Then, with the use of the function of the display control unit 21e, the control unit 20 updates the front image on which the arrow-shaped guide line gl is superimposed, and causes the user I/F unit 45 to display the updated front image (S130, FIG. 5C). During a period in which the vehicle C is in the post-start state of the lane change state, steps S170 to S175 and S130 are repeatedly executed, and the arrow-shaped guide line gl becomes a polygonal guide line gl that connects the front end point FE located on the central line RC of the recommended lane, the first change point K1 and the rear end point BE at the midpoint CC of the lower side of the front image, the midpoint CC indicating the widthwise central position of the vehicle C. By so doing, in the post-start state where the driver is making a lane change, it is possible to relatively move the rear end point BE that indicates the position at which the vehicle C is currently travelling in the arrow-shaped guide line gl with respect to the images BL of the separation lines of the travelling lane so as to follow a variation in the position of the vehicle C. In addition, in the post-start state as well, because the front end point FE is kept at the set position H in the vertical direction of the front image, the position of the recommended lane, indicated by the front end point FE, is easily recognized. Furthermore, in the post-start state, because the length of the recommended lane-side guide line portion RL that indicates a position within the recommended lane is kept at the predetermined value Y, it is possible to make it easy to recognize the position of the recommended lane and the lane direction of the recommended lane, which are indicated by the recommended lane-side guide line portion RL.

(3) Alternative Embodiments

In the present embodiment, with the use of the function of the display control unit 21e, the control unit 20 keeps the vertical position of the front end point FE in the front image constant, keeps the length of the recommended lane-side guide line portion RL constant and keeps the acute angle Z made between the image BL of the separation line present between the travelling lane and the recommended lane and the line (crossing line portion CL) that connects the first change point K1 to the second change point K2 constant. However, when, with the use of the function of the display control unit 21e, the control unit 20 at least keeps the vertical position of the front end point FE constant, it is possible to make it easy to recognize the position of the recommended lane, indicated by the front end point FE. Furthermore, it is applicable that, with the use of the function of the display control unit 21e, the control unit 20 keeps the vertical position of the front end point FE in the front image constant and keeps the length of the recommended lane-side guide line portion RL constant while allowing the acute angle Z made between the image BL of the separation line present between the travelling lane and the recommended lane and the line (crossing line portion CL) that connects the first change point K1 to the second change point K2 to be smaller than the predetermined angle. In this case as well, it is possible to make it easy to recognize the position of the recommended lane, indicated by the front end point FE and the recommended lane-side guide line portion RL. In addition, it is applicable that, with the use of the function of the display control unit 21e, the control unit 20 keeps the vertical position of the front end point FE in the front image constant and keeps the acute angle Z made between the image BL of the separation line present between the travelling lane and the recommended lane and the line (crossing line portion CL) that connects the first change point K1 to the second change point K2 constant while allowing the recommended lane-side guide line portion RL to be smaller than the predetermined value Y. In this case as well, it is possible to make it easy to recognize the position of the recommended lane, indicated by the front end point FE, and guidance that a lane change should be made to the recommended lane. Furthermore, with the use of the function of the display control unit 21e, the control unit 20 does not need to keep the length of the recommended lane-side guide line portion RL at the predetermined value and does not need to keep the acute angle Z made between the image BL of the separation line present between the travelling lane and the recommended lane and the line (crossing line portion CL) that connects the first change point K1 to the second change point K2 at the predetermined value, but the control unit 20 may allow the length of the recommended lane-side guide line portion RL to vary within a range larger than or equal to the predetermined value and allow the acute angle Z to vary within a range larger than or equal to the predetermined value.

In the present embodiment, with the use of the function of the determination unit 21d, the control unit 20 determines that the vehicle C is in the lane change state when the travelling lane is different from the recommended lane. Instead, it may be determined that the vehicle C is in the lane change state when the travelling lane is different from the recommended lane and the vehicle C is operating to make a lane change from the travelling lane to the recommended lane. That is, the timing at which the vehicle C changes from the state where the rear end point BE of the guide line gl indicates the widthwise central position of the travelling lane to the state where the rear end point BE indicates the widthwise central position of the vehicle C may be set as the timing at which the vehicle C operates to make a lane change. By so doing, even when the travelling lane is different from the recommended lane, during a period in which the driver intentionally causes the vehicle C to travel in the travelling lane, it is possible to keep the position indicated by the rear end point BE in the front image at the widthwise central position in the travelling lane, so it is possible to prevent the driver from being unnecessarily alerted as the position indicated by the rear end point BE follows the position of the vehicle C. In addition, with the use of the function of the determination unit 21d, the control unit 20 may determine whether the vehicle C is in the lane change state on the basis of determination elements, such as a state of the driver, an operation state of the vehicle C, a driving operation state of the vehicle C and a state of a surrounding environment. With the use of the function of the determination unit 21d, the control unit 20 may determine that the vehicle C is in the lane change state when a direction indicator that indicates a direction toward the recommended lane is operated, a steering angle is changed to a direction toward the recommended lane or a predetermined acceleration or deceleration operation is performed.

With the use of the function of the display control unit 21e, the control unit 20 may correct the arrow-shaped guide line gl such that a difference in width between gaps formed between the images BL of the left and right separation lines of the recommended lane in the front image and the arrow head is suppressed. FIG. 7A is a view that shows a state where the arrow-shaped guide line gl is corrected in the front image. In the drawing, the front end point FE is a vertex, and indicates an isosceles triangle-shaped arrow head AH that is symmetrical with respect to the recommended lane-side guide line portion RL within the image of the recommended lane. In the arrow head AH, at the position of the left base vertex, the horizontal width $a_1$ of a gap between the arrow head AH and the image BL of the left separation line of the recommended lane is the narrowest. Similarly, at the position of the right base vertex of the arrow head AH, the horizontal width $a_2$ of a gap between the arrow head AH and the image BL of the right separation line of the recommended lane is the narrowest. Note that the positions of the left and right base vertices of the arrow head AH are positions shifted from a predetermined position (white circle) on the recommended lane-side guide line portion RL toward both sides of the recommended lane-side guide line portion RL by a predetermined distance in the perpendicular direction. In the present embodiment, with the use of the function of the display control unit 21e, the control unit 20 shifts the front end point FE toward the image of the travelling lane by a correction amount a in the horizontal direction such that the difference between the width $a_1$ of the left gap and the width $a_2$ of the right gap is suppressed, and inclines the recommended lane-side guide line portion RL by a correction angle q from an original inclination angle Q. It is assumed that the inclination angle Q is an angle made at the first change point K1 between the recommended lane-side guide line portion RL and an auxiliary line N (alternate long and two short dashes line) in the horizontal direction of the front image and indicates an angle closer to the bisector that transversely bisects the front image. Note that, when the lane directions of the lanes are linear and are parallel to each other, the inclination angle Q closer to the bisector on which a vanishing point is present is definitely an acute angle smaller than or equal to 90 degrees. Note that, the front end point FE is just shifted in the horizontal direction, so the vertical position of the front end point FE is kept at the set position H.

With the use of the function of the display control unit 21e, when it is initially determined in step S145 of FIG. 6 that the vehicle C is in the pre-start state of the lane change state, the control unit 20 sets the correction angle q after step S160 and before step S130. With the use of the function of the display control unit 21e, when the control unit 20 generates the arrow head AH without correcting the front end point FE, the control unit 20 determines the horizontal width $a_1$ of the left gap and the horizontal width $a_2$ of the right gap. Both gaps are respectively formed between the arrow head AH and the images BL of the left and right separation lines. Then, with the use of the function of the display control unit 21e, the control unit 20 sets a value obtained by subtracting half the horizontal width $a_1$ of the left gap from half the horizontal gap $a_2$ of the right gap as a rightward correction amount a ($=a_2/2-a_1/2$) (toward the travelling lane) in the horizontal direction of the front end point FE.

Then, with the use of the function of the display control unit 21e, the control unit 20 sets a correction angle q for inclining the recommended lane-side guide line portion RL such that the recommended lane-side guide line portion RL passes through a corrected front end point fe, obtained by shifting the front end point FE rightward by the correction amount a, and the first change point K1. Note that, when the correction amount a is negative, the front end point FE is shifted leftward in the horizontal direction. When the correction angle q is set, with the use of the function of the display control unit 21e, the control unit 20 sets a corrected recommended lane-side guide line portion rl and the corrected front end point fe. The corrected recommended lane-side guide line portion rl is obtained by inclining the recommended lane-side guide line portion RL by the correction angle q around the first change point K1. The corrected front end point fe is obtained by shifting the front end point FE toward the image of the travelling lane by the correction amount a in the horizontal direction. Note that an angle (Q−q) obtained by subtracting the correction angle q from the inclination angle Q of the pre-corrected recommended lane-side guide line portion RL with respect to the horizontal direction is the inclination angle of the corrected recommended lane-side guide line portion rl with respect to the auxiliary line N. Note that, when the distance in the vertical direction between the first change point K1 and the front end point FE is M, the length of the pre-corrected recommended lane-side guide line portion RL may be expressed by M/sin Q, and the length of the corrected recommended lane-side guide line portion rl may be expressed by M/sin(Q−q). Because the inclination angle Q is an acute angle, sin Q>sin(Q−q). Thus, the length of the corrected recommended lane-side guide line portion rl is longer than the length of the pre-corrected recommended lane-side guide line portion RL, and the length of the corrected recommended lane-side guide line portion rl is kept larger than or equal to the predetermined value Y.

When the corrected recommended lane-side guide line portion rl is set as described above, an arrow-shaped guide line gl that is symmetrical with respect to the corrected recommended lane-side guide line portion rl is generated in step S130. By inclining the recommended lane-side guide line portion RL by the correction angle q as described above, it is possible to shift the positions of the left and right base vertices of the arrow head AH toward the image of the travelling lane by the correction amount a. Note that, strictly speaking, the arrow head AH rotationally shifts as the recommended lane-side guide line portion RL inclines, so the displacements of the positions of the left and right base vertices of the arrow head AH in the horizontal direction differ from the correction amount a; however, the correction angle q is small enough, so a rotational displacement component may be ignored. Thus, after correction, the horizontal width of the left gap is $(a_1+a)=(a_1/2+a_2/2)$, and the horizontal width of the right gap is $(a_2-a)=(a_1/2+a_2/2)$, so the horizontal width of the left gap and the horizontal width of the right gap are equal to each other.

With the use of the function of the display control unit 21e, when it is initially determined in step S145 of FIG. 6 that the vehicle C is in the pre-start state of the lane change state, the control unit 20 sets a correction angle q after step S160 and before step S130, and corrects the shape of the arrow-shaped guide line gl by inclining the recommended lane-side guide line portion RL from the original inclination angle Q by the correction angle q. After that, with the use of the function of the display control unit 21e, during a period in which the pre-start state continues, the control unit 20 corrects the shape of the arrow-shaped guide line gl by inclining the recommended lane-side guide line portion RL by the set correction angle q after step S160 and before step S130. By so doing, it is possible to prevent offset of the arrow head AH toward one of left and right sides on the image of the recommended lane in the front image. In addition, when the lane width of the recommended lane is narrow, it is possible to prevent interference of the arrow head AH with one of the images BL of the left and right separation lines of the recommended lane in the front image. In addition, because it is possible to suppress a difference between the width $a_1$ of the left gap and the width $a_2$ of the right gap by rotating and translating the arrow head AH, the shape of the arrow head AH itself is not distorted.

On the other hand, with the use of the function of the display control unit 21e, when the vehicle C is in the post-start state of the lane change state, the control unit 20 corrects the correction angle from q to q×(X/P) after step S175 and before step S130 and then corrects the shape of the arrow-shaped guide line gl by inclining the recommended lane-side guide line portion RL from the original inclination angle Q by the correction angle q×(X/P). Here, (X/P) is a coefficient that indicates the progress of lane change in the post-start state. As shown in FIG. 7B, X is a distance between the midpoint CC and a position I of the central line RC of the recommended lane on the lower side of the front image. When the midpoint CC that indicates the widthwise central position of the vehicle C coincides with the position I of the central line RC of the recommended lane on the lower side of the front image, it is presumable that the vehicle C is travelling at the widthwise central position in the recommended lane and has completed making a lane change. Thus, X means a distance that the midpoint CC relatively moves on the lower side of the front image with respect to the position I of the central line RC of the recommended lane from the present by the time when a lane change has been completed. Note that, with the use of the function of the display control unit 21e, the control unit 20 may determine that a lane change has been completed when the distance in the horizontal direction between the midpoint CC of the lower side of the front image and the first change point K1 is shorter than or equal to a predetermined distance. This is because, when the distance in the horizontal direction between the midpoint CC of the lower side of the front image and the first change point K1 is shorter than or equal to the predetermined distance, a guide line GL having an approximately straight line shape is formed of the recommended lane-side guide line portion RL and the crossing line portion CL, and the driver is able to recognize that the vehicle should travel straight ahead and that a lane change has been completed.

P is a distance between a position J and the position I. The position J is shifted from the position G of the image BL of the separation line between the recommended lane and the travelling lane (immediately preceding travelling lane when the vehicle C is already travelling in the recommended lane) on the lower side of the front image toward the travelling lane by a predetermined distance T corresponding to half the vehicle width. The position I is located on the central line RC of the recommended lane on the lower side of the front image. At the timing at which the midpoint CC that indicates the widthwise central position of the vehicle C coincides with the position J on the lower side of the front image, the vehicle C changes from the pre-start state to the post-start state. Thus, P means a distance by which the midpoint CC relatively moves on the lower side of the front image with respect to the position I of the central line RC of the recommended lane by the time when a lane change has been completed after the vehicle C enters the post-start state. Thus, the correction angle q×(X/P) becomes q at the timing at which the vehicle C changes from the pre-start state to the post-start state, reduces with the progress of lane change and becomes zero at the timing at which the lane change has been completed. That is, in the post-start state, with the use of the function of the display control unit 21e, the control unit 20 reduces the correction angle q×(X/P) as a lane change progresses and the direction of the recommended lane-side guide line portion RL approaches the vertical direction. As the lane change progresses and the direction of the recommended lane-side guide line portion RL approaches the vertical direction, the differences between the arrow head AH and the vertical positions of the left and right base vertices reduce, and the images BL of the left and right separation lines of the recommended lane approach line symmetry with each other with respect to the recommended lane-side guide line portion RL. Thus, with the progress of lane change, the difference between the width $a_1$ of the left gap formed between the arrow head AH and the image BL of the left separation line of the recommended lane and the width $a_2$ of the right gap formed between the arrow head AH and the image BL of the right separation line of the recommended lane reduces. In response to a reduction in the difference between the width $a_1$ of the left gap and the width $a_2$ of the right gap, the correction angle q×(X/P) for suppressing the difference can also be reduced, so it is possible to prevent an excessive correction amount a of the front end point FE.

By a technique other than the technique for correcting the recommended lane-side guide line portion RL from an original inclination angle Q, the difference between the width $a_1$ of the left gap formed between the arrow head AH and the image BL of the left separation line of the recommended lane and the width $a_2$ of the right gap formed between the arrow head AH and the image BL of the right separation line may be suppressed. For example, in the front image, without correcting the position of the front end point FE, corresponding to the vertex of the arrow head AH, the left and right base vertices of the arrow head AH each may be corrected by the correction amount a in the horizontal direction. Furthermore, it is not necessary to correct the inclination angle Q of the recommended lane-side guide line portion RL while correcting the correction amount a of the front end point FE in the horizontal direction. With the use of the function of the display control unit 21e, the control unit 20 may just rotate the recommended lane-side guide line portion RL by the correction angle q or the correction angle q×(X/P). In this case, the vertical position of the corrected front end point FE varies, but it is possible to keep the length of the recommended lane-side guide line portion RL constant.

In the embodiment, with the use of the function of the display control unit 21e, the control unit 20 sets the second change point K2 only in the pre-start state of the lane change state as shown in Table 1; instead, the control unit 20 may set the second change point K2 even in the post-start state of the lane change state. Specifically, with the use of the function of the display control unit 21e, the control unit 20 may set the second change point K2 on the bisector that transversely bisects the front image as in the case of the second change point K2 (FIG. 4B) in the pre-start state according to the embodiment. However, with the use of the function of the display control unit 21e, the control unit 20 sets the vertical position of the second change point K2 in the front image to a predetermined position downward of the first change point K1. In the post-start state, there is a case where the image BL of the separation line between the travelling lane and the recommended lane, of the separation lines of the recommended lane, does not intersect with the crossing line portion CL and, even when the image BL of the separation line between the travelling lane and the recommended lane intersects with the crossing line portion CL, the image BL of the separation line between the travelling lane and the recommended lane intersects at an angle close to parallel relation, so it is impossible to set the second change point K2 such that the acute angle Z made between the image BL of the separation line between the travelling lane and the recommended lane, of the separation lines of the recommended lane, and the crossing line portion CL becomes the predetermined angle. The predetermined position in the vertical direction, at which the second change point K2 is set in the front image, is desirably a vertical position at which the second change point K2 is set immediately before the vehicle C changes from the pre-start state to the post-start state. By so doing, at the timing at which the vehicle C changes from the pre-start state to the post-start state, it is possible to prevent a steep shift of the second change point K2.

Figure 8:
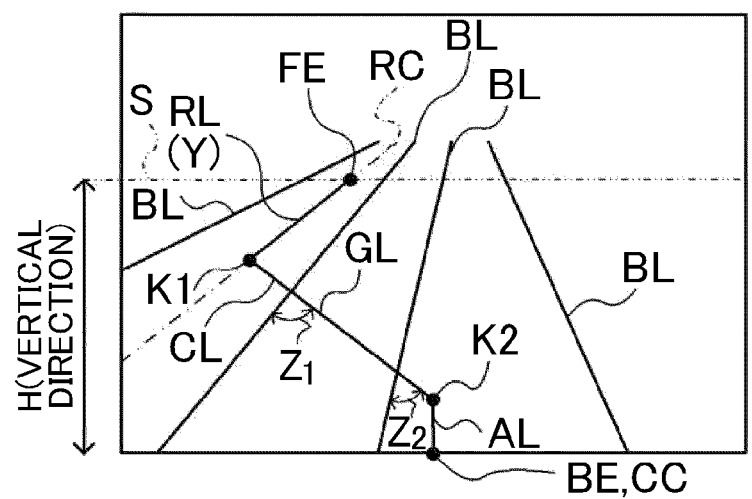
[FIG. 8]

In the above description, the case where the recommended lane and the travelling lane are adjacent to each other is illustrated; instead, one or more other lanes may be interposed between the recommended lane and the travelling lane. In this case, a line (crossing line portion CL) that connects the first change point K1 set in the image of the recommended lane to the second change point K2 set in the image of the travelling lane in the front image intersects with images BL of a plurality of separation lines present between the recommended lane and the travelling lane. FIG. 8 shows an example in which a crossing line portion CL intersects with images BL of two separation lines. With the use of the function of the display control unit 21e, the control unit 20 identifies an acute angle $Z_2$ that is the smallest between acute angles $Z_1$ and $Z_2$ respectively formed at points at which the crossing line portion CL intersects with the images BL of the two separation lines, and sets the second change point K2 such that the acute angle $Z_2$ becomes the predetermined angle (60 degrees). By so doing, it is possible to set each of the acute angles Z, at which the line (crossing line portion CL) that connects the first change point K1 to the second change point K2 intersects with the images BL of the plurality of separation lines present between the recommended lane and the travelling lane, to the predetermined angle or above. Thus, the driver is able to easily recognize guidance that a lane change should be made across a separation line for any separation line.

With the use of the function of the lane identification unit 21c, the control unit 20 just needs to identify a lane in which the vehicle C should travel as a recommended lane and, when there is a lane that the vehicle C should enter at an intersection ahead of the vehicle C in a scheduled travel route, may identify the lane as a recommended lane when the vehicle C has approached the intersection within a predetermined distance. In addition, with the use of the function of the lane identification unit 21c, the control unit 20 may identify a lane in which the vehicle C is able to more safely or more smoothly travel than the other lanes as a recommended lane. With the use of the function of the display control unit 21e, the control unit 20 may generate a broken or dotted guide line gl that connects the front end point to the rear end point. Furthermore, with the use of the function of the display control unit 21e, the control unit 20 may directly superimpose a narrow line-shaped guide line GL on the front image.

In addition, with the use of the function of the display control unit 21e, the control unit 20 may suppress the difference between the horizontal width $a_1$ of the left gap formed between the arrow head AH and the image BL of the left separation line of the recommended lane and the horizontal width $a_2$ of the right gap formed between the arrow head AH and the image BL of the right separation line of the recommended lane by a technique other than inclining the recommended lane-side guide line portion RL. For example, the difference between the width $a_1$ of the left gap and the width $a_2$ of the right gap may be suppressed by forming the shape of the arrow head AH asymmetrically with respect to the recommended lane-side guide line portion RL without inclining the recommended lane-side guide line portion RL. For example, with the use of the function of the display control unit 21e, the control unit 20 may set the smaller one of the widths $a_1$ and $a_2$ of the gaps at the base vertices of the arrow head AH at a position closer to the recommended lane-side guide line portion RL than the larger one to thereby correct the shape of the arrow head AH itself.

The invention claimed is:

1. A lane guidance display system comprising:
   a front image acquisition unit that acquires a front image obtained by capturing an area ahead of a vehicle;
   a lane identification unit that identifies a travelling lane in which the vehicle is currently travelling and a recommended lane in which the vehicle should travel in the front image;
   a determination unit that determines whether the vehicle is in a lane change state where the vehicle is going to make a lane change from the travelling lane to the recommended lane; and
   a display control unit that causes a display unit to display the front image on which a guide line is superimposed, wherein the guide line has a front end point that indicates a position inside the recommended lane and has a rear end point that indicates a position rearward of the front end point, wherein
   when the vehicle is in the lane change state, the display control unit sets a position of the rear end point in the front image such that the rear end point indicates a central position in a width direction of the vehicle, and
   when the vehicle is not in the lane change state, the display control unit sets a position of the rear end point in the front image such that the rear end point indicates a central position in a width direction in the travelling lane.

2. The lane guidance display system according to claim 1, wherein, when the travelling lane is different from the recommended lane, the determination unit determines that the vehicle is in the lane change state.

3. The lane guidance display system according to claim 2, wherein, when the travelling lane is different from the recommended lane and the vehicle is operating to make a lane change from the travelling lane to the recommended lane, the determination unit determines that the vehicle is in the lane change state.

4. The lane guidance display system according to claim 3, wherein, when the vehicle is crossing a separation line between the recommended lane and the travelling lane, of the separation lines of the travelling lane, the determination unit determines that the vehicle is operating to make a lane change from the travelling lane to the recommended lane.

5. The lane guidance display system according to claim 1, wherein, when the vehicle is not in the lane change state, the display control unit identifies a central line that passes through a midpoint between images of left and right separation lines of the travelling lane in a horizontal direction of the front image, and sets the rear end point at a position on the central line in the front image.

6. A lane guidance display method comprising:
   a front image acquisition step of acquiring a front image obtained by capturing an area ahead of a vehicle;
   a lane identification step of identifying a travelling lane in which the vehicle is currently travelling and a recommended lane in which the vehicle should travel in the front image;
   a determining step of determining whether the vehicle is in a lane change state where the vehicle is going to make a lane change from the travelling lane to the recommended lane; and
   a display control step of causing a display unit to display the front image on which a guide line is superimposed, wherein the guide line has a front end point that indicates a position inside the recommended lane and has a rear end point that indicates a position rearward of the front end point, wherein
   in the display control step, when the vehicle is in the lane change state, a position of the rear end point is set in the front image such that the rear end point indicates a central position in a width direction of the vehicle, and
   in the display control step, when the vehicle is not in the lane change state, a position of the rear end point is set in the front image such that the rear end point indicates a central position in a width direction in the travelling lane.

7. A non transitory storage medium storing a computer-executable lane guidance display program causing a computer to perform:
   a front image acquisition function of acquiring a front image obtained by capturing an area ahead of a vehicle;
   a lane identification function of identifying a travelling lane in which the vehicle is currently travelling and a recommended lane in which the vehicle should travel in the front image;
   a determining function of determining whether the vehicle is in a lane change state where the vehicle is going to make a lane change from the travelling lane to the recommended lane; and a display control function of causing a display unit to display the front image on which a guide line is superimposed, wherein the guide line has a front end point that indicates a position inside the recommended lane and has a rear end point that indicates a position rearward of the front end point, wherein when the vehicle is in the lane change state, the computer performs the display control function to set a position of the rear end point in the front image such that the rear end point indicates a central position in a width direction of the vehicle, and when the vehicle is not in the lane change state, the computer performs the display control function to set a position of the rear end point in the front image such that the rear end point indicates a central position in a width direction in the travelling lane.

8. The lane guidance display system according to claim 2, wherein, when the vehicle is not in the lane change state, the display control unit identifies a central line that passes through a midpoint between images of left and right separation lines of the travelling lane in a horizontal direction of the front image, and sets the rear end point at a position on the central line in the front image.

9. The lane guidance display system according to claim 3, wherein, when the vehicle is not in the lane change state, the display control unit identifies a central line that passes through a midpoint between images of left and right separation lines of the travelling lane in a horizontal direction of the front image, and sets the rear end point at a position on the central line in the front image.

10. The lane guidance display system according to claim 4, wherein, when the vehicle is not in the lane change state, the display control unit identifies a central line that passes through a midpoint between images of left and right separation lines of the travelling lane in a horizontal direction of the front image, and sets the rear end point at a position on the central line in the front image.

* * * * *